(12) United States Patent
Duprey et al.

(10) Patent No.: US 6,671,705 B1
(45) Date of Patent: Dec. 30, 2003

(54) REMOTE MIRRORING SYSTEM, DEVICE, AND METHOD

(75) Inventors: Dennis Duprey, Raleigh, NC (US); Jeffrey Lucovsky, Cary, NC (US); Guillermo Roa, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/375,860

(22) Filed: Aug. 17, 1999

(51) Int. Cl.$^7$ ............................................... G06F 17/30
(52) U.S. Cl. ........................ 707/204; 707/202; 711/162
(58) Field of Search ................. 707/201, 202, 707/203, 204; 711/162

(56) References Cited

U.S. PATENT DOCUMENTS

| | | | |
|---|---|---|---|
| 5,544,347 A | | 8/1996 | Yanai et al. ................. 711/162 |
| 5,546,536 A | * | 8/1996 | Davis et al. .................. 714/20 |
| 5,758,355 A | * | 5/1998 | Buchanan .................... 707/201 |
| 5,799,323 A | | 8/1998 | Mosher, Jr. et al. ......... 707/202 |
| 5,835,953 A | * | 11/1998 | Ohran ......................... 711/162 |
| 5,924,096 A | * | 7/1999 | Draper et al. ................. 707/10 |
| 6,065,018 A | * | 5/2000 | Beier et al. .................. 707/202 |
| 6,173,377 B1 | * | 1/2001 | Yanai et al. ................. 711/162 |
| 6,192,460 B1 | * | 2/2001 | Goleman et al. ............... 712/1 |
| 6,205,449 B1 | * | 3/2001 | Rastogi et al. .............. 707/202 |
| 6,260,125 B1 | * | 7/2001 | McDowell ................... 711/162 |

FOREIGN PATENT DOCUMENTS

EP          0 405 859 A2    1/1991

\* cited by examiner

Primary Examiner—John Breene
Assistant Examiner—Khanh Pham
(74) Attorney, Agent, or Firm—Bromberg & Sunstein LLP

(57) ABSTRACT

In a remote mirroring system, device, and method, a master storage unit stores information in a log and uses the information from the log to quickly resynchronize slave images following a failure in the master storage unit. Upon receiving a write request from a host, the master storage unit stores a write entry in the log. The write entry includes information that identifies a portion of the slave images that may be unsychronized from the master image due to the write request. The master storage unit then proceeds to update the master image and the slave images. The log is preserved through the failure, such that the log is available to the master storage unit upon recovery from the failure. When the master storage unit is operational following the failure, the master storage unit resynchronizes the slave images to the master image by copying those portions of the master image indicated in the log to the slave images.

11 Claims, 7 Drawing Sheets

REMOTE MIRRORING SYSTEM, DEVICE, AND METHOD

CROSS-REFERENCE TO RELATED APPLICATIONS

The following commonly-owned United States patent applications may be related to the subject patent application, and are hereby incorporated by reference in their entireties:

Application Ser. No. 09/375,331 entitled A COMPUTER ARCHITECTURE UTILIZING LAYERED DEVICE DRIVERS, filed in the names of David Zeryck, Dave Harvey, and Jeffrey Lucovsky on even date herewith; and Application Ser. No. 09/376,173 entitled SYSTEM, DEVICE, AND METHOD FOR INTERPROCESSOR COMMUNICATION IN A COMPUTER SYSTEM, filed in the names of Alan L. Taylor, Jeffrey Lucovsky, and Karl Owen on even date herewith.

FIELD OF THE INVENTION

The present invention relates generally to computer storage systems, and more particularly to remote mirroring in distributed computer storage systems.

BACKGROUND OF THE INVENTION

In a common computer system architecture, a host computer is coupled to a computer storage system that provides non-volatile storage for the host computer. The computer storage system includes, among other things, a number of interconnected storage units. Each storage unit includes a number of physical or logical storage media (for example, a disk array). For convenience, a group of one or more physical disks that are logically connected to form a single virtual disk is referred to hereinafter as a "Logical Unit" (LU). Data from the host computed is stored in the computer storage system, and specifically in the various storage units within the computer storage system.

One problem in a computer storage system is data loss or unavailability, for example, caused by maintenance, repair, or outright failure of one or more storage units. In order to prevent such data loss or unavailability, a copy of the host data is often stored in multiple storage units that are operated at physically separate storage units. For convenience, the practice of storing multiple copies of the host data in physically separate storage units is referred to as "remote mirroring." Remote mirroring permits the host data to be readily retrieved from one of the storage units when the host data at another storage unit is unavailable or destroyed.

Therefore, in order to reduce the possibility of data loss or unavailability in a computer storage system, a "remote mirror" (or simply a "mirror") is established to manage multiple images. Each image consists of one or more LUs, which are referred to hereinafter collectively as a "LU Array Set." It should be noted that the computer storage system may maintain multiple mirrors simultaneously, where each mirror manages a different set of images.

Within a particular mirror, one image is designated as a master image, while each other image within the mirror is designated as a slave image. For convenience, the storage unit that maintains the master image is referred to hereinafter as the "master storage unit," while a storage unit that maintains a slave image is referred to hereinafter as a "slave storage unit." It should be noted that a storage unit that supports multiple mirrors may operate as the master storage unit for one mirror and the slave storage unit for another mirror.

In order for a mirror to provide data availability such that the host data can be readily retrieved from one of the slave storage units when the host data at the master storage unit is unavailable or destroyed, it is imperative that all of the slave images be synchronized with the master image such that all of the slave images contain the same information as the master image. Synchronization of the slave images is coordinated by the master storage unit.

Under normal operating conditions, the host writes host data to the master storage unit, which stores the host data in the master image and also coordinates all data storage operations for writing a copy of the host data to each slave storage unit in the mirror and verifying that each slave storage unit receives and stores the host data in its slave image. The data storage operations for writing the copy of the host data to each slave storage unit in the mirror can be handled in either a synchronous manner or an asynchronous manner. In synchronous remote mirroring, the master storage unit ensures that the host data has been successfully written to all slave storage units in the mirror before sending an acknowledgment to the host, which results in relatively high latency, but ensures that all slaves are updated before informing the host that the write operation is complete. In asynchronous remote mirroring, the master storage unit sends an acknowledgment message to the host before ensuring that the host data has been successfully written to all slave storage units in the mirror, which results in relatively low latency, but does not ensure that all slaves are updated before informing the host that the write operation is complete.

In both synchronous and asynchronous remote mirroring, it is possible for the master storage unit to fail sometime between receiving a write request from the host and updating the master image and all of the slave-images. The master storage unit may fail, for example, due to an actual hardware or software failure in the master storage unit or an unexpected power failure. If the master storage unit was in the process of completing one or more write operations at the time of the failure, the master storage unit may not have updated any image, may have updated the master image but no slave image, may have updated the master image and some of the slave images, or may have updated the master image and all of the slave images for any particular write operation. Furthermore, the master storage unit may or may not have acknowledged a particular write request prior to the failure.

After the failure, it may not be possible for the master storage unit to determine the status of each slave image, and specifically whether a particular slave image matches the master image. Therefore, the master storage unit typically resynchronizes all of the slave images by copying the master image block-by-block to each of the slave storage units. This synchronizes the slave images to the master image, but does not guarantee that a particular write request was completed. Unfortunately, copying the entire master image to all slave storage units can take a significant amount of time depending on the image size, the number of slave storage units, and other factors. It is not uncommon for such a resynchronization to take hours to complete, especially for very large images.

Thus, there is a need for a system, device, and method for quickly resynchronizing slave images following a failure.

SUMMARY OF THE INVENTION

In accordance with one aspect of the present invention, a master storage unit utilizes a write intent log to quickly resynchronize slave images following a failure in the master storage unit. The write intent log is preserved through the failure, such that the write intent log is available to the master storage unit upon recovery from the failure. The write intent log identifies any portions of the slave images that may be unsynchronized from the master image. The master storage unit resynchronizes only those portions of the slave images that may be unsynchronized as indicated in the write intent log.

In a preferred embodiment, the write intent log identifies any image blocks that may be unsynchronized. In order to resynchronize the slave images, the master storage unit copies only those image blocks indicated in the write intent log from the master image to the slave images.

By resynchronizing only those portions of the slave images that may be unsynchronized, the master storage unit is able to resynchronize the slave images in significantly less time (perhaps seconds rather than hours) than it would have taken to copy the entire master image block-by-block to each of the slave storage units.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
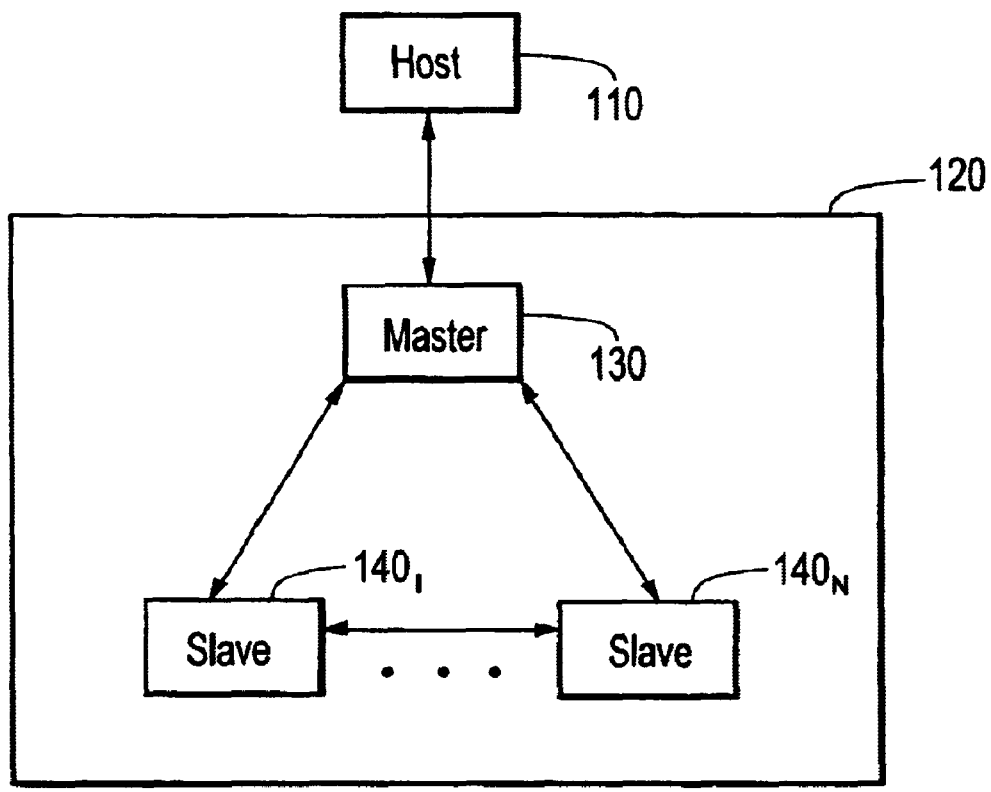
FIG. 1 is a block diagram showing an exemplary computer storage system in accordance with an embodiment of the present invention.

An embodiment of the present invention enables the master storage unit to quickly resynchronize slave images following a failure by only updating those portions of the slave images that may be unsynchronized from the corresponding portions of the master image (i.e., any portions of the slave images that may differ from the corresponding portions of the master image). Specifically, the master storage unit maintains a log (referred to hereinafter as the "write intent log") that identifies any portions of the slave images that may be unsynchronized. The write intent log is maintained in such a way that it is guaranteed to survive a failure, and therefore is available to the master storage unit following a failure. When the master storage unit is operational following the failure, the master storage unit resynchronizes the slave images by resynchronizing those portions of the slave images that may be unsynchronized, preferably by copying from the master image to each of the slave storage units those image blocks that may be unsynchronized as identified in the write intent log. A portion of the slave images identified in the write intent log is resynchronized even if the identified portion is in fact synchronized with the master image in one or more slave images. By resynchronizing only those portions of the slave images that may have been unsynchronized, the master storage unit is able to resynchronize the slave images in significantly less time (perhaps seconds rather than hours) than it would have taken to copy the entire master image block-by-block to each of the slave storage units.

More specifically, when the master storage unit receives a write request from the host, the master storage unit stores a write entry in the write intent log. The write entry includes information that identifies a portion of the mirror image to be affected by the write operation (such as a block offset and length) as well as, in the case of asynchronous mirroring, the actual data to be written into the mirror image. For convenience, the information in the write entry is referred to hereinafter as "meta-data" in order to distinguish it from the actual data to be written into the mirror image.

In a preferred embodiment of the present invention, the master storage unit maintains the write intent log in a high-speed memory (referred to hereinafter as the "write cache") during normal operation of the mirror. This allows the master storage unit to quickly add write entries to the write intent log. If the master storage unit includes redundant storage processors (described in detail below), then each storage processor maintains its own write intent log that is replicated on the peer storage processor. This allows one storage processor to take over for the other storage processor when a storage processor (but not the entire master storage unit) fails. In case of a complete master storage unit failure, the master storage unit includes automatic backup/restoral logic that, among other things, automatically stores the entire write intent log in a non-volatile storage (such as a disk) upon detecting the failure and automatically restores the write intent log from the non-volatile storage upon recovery from the failure. The automatic backup/restoral logic is extremely robust, with redundant battery backup and redundant storage capabilities to ensure that the write intent log is recoverable following the failure.

Once the master storage unit has stored a write entry in the write intent log, the master storage unit proceeds to update the master image and the slave image(s) based upon the write request. Assuming the master storage unit is able to successfully update the master image and all of the slave images, then the write entry is no longer needed, in which case the master storage unit deletes the write entry from the write intent log. In a preferred embodiment of the present invention, the master storage unit deletes write entries from the write intent log using a "lazy" deletion mechanism.

Specifically, the master storage unit deletes an unneeded write entry from the write intent log at a time that is convenient for the master storage unit, and not necessarily as soon as the master storage unit determines that the write entry is no longer needed. The master storage unit typically runs periodic cleanups of the write intent log, where the master storage unit may delete a number of unneeded write entries during each cleanup cycle. This deletion scheme is implementationally more efficient than deleting the unneeded write entries one-at-a-time, although it may allow some unneeded write entries to persist in the write intent log for some period of time.

If a storage processor fails, the write operations corresponding to any write entries in the write intent log may be at different points of completion. For example, the master storage unit may not have updated any image, may have updated the master image but no slave image, may have updated the master image and some of the slave images, or may have updated the master image and all of the slave images for any particular write operation.

Assuming that the master storage unit has redundant storage processors, the write intent log maintained by the failed storage processor is replicated on the peer storage processor. Therefore, once the peer storage processor has taken over for the failed storage processor, the master storage unit resynchronizes all of the slave images to the master image by updating only those portions of the slave images identified in the write intent log, preferably by copying the corresponding image blocks from the master image to the slave storage units.

If the master storage unit fails, the automatic backup/restoral logic automatically stores the write intent log in the non-volatile storage. When this occurs, the write operations corresponding to any write entries in the write intent log may be at different points of completion. For example, the master storage unit may not have updated any image, may have updated the master image but no slave image, may have updated the master image and some of the slave images, or may have updated the master image and all of the slave images for any particular write operation.

Once the master storage unit is operational following the failure, the automatic backup/restoral logic automatically restores the write intent log from the non-volatile storage. The master storage unit then resynchronizes all of the slave images to the master image by updating only those portions of the slave images identified in the write intent log, preferably by copying the corresponding image blocks from the master image to the slave storage units.

FIG. 1 shows an exemplary computer system 100 in accordance with an embodiment of the present invention. The exemplary computer system 100 includes a host 11 coupled to a computer storage system 120. The computer storage system 120 includes a master storage unit 130 and a number of slave storage units $140_1$ through $140_N$. The remote mirroring functionality of the present invention requires each storage unit in the computer storage system 100 to maintain a communication link to all of the other storage units in the computer storage system 100, such that each storage unit is capable of addressing all of the other storage units in the computer storage system 100. The host 110 is coupled to the master storage unit 130, and accesses the mirror through the host 110.

In a preferred embodiment of the present invention, each of the storage units in the computer storage system, such as the master storage unit 130 and the slave storage units $140_1$ through $140_N$ in the computer storage system 120, is a fault-tolerant RAID (redundant array of independent disks) storage unit with redundant management and storage capabilities. Remote mirroring is implemented as an add-on feature of the storage unit. Remote mirroring is used for providing disaster recovery, remote backup, and other data integrity solutions, specifically by keeping byte-for-byte copies of an image at multiple geographic locations.

Figure 2:
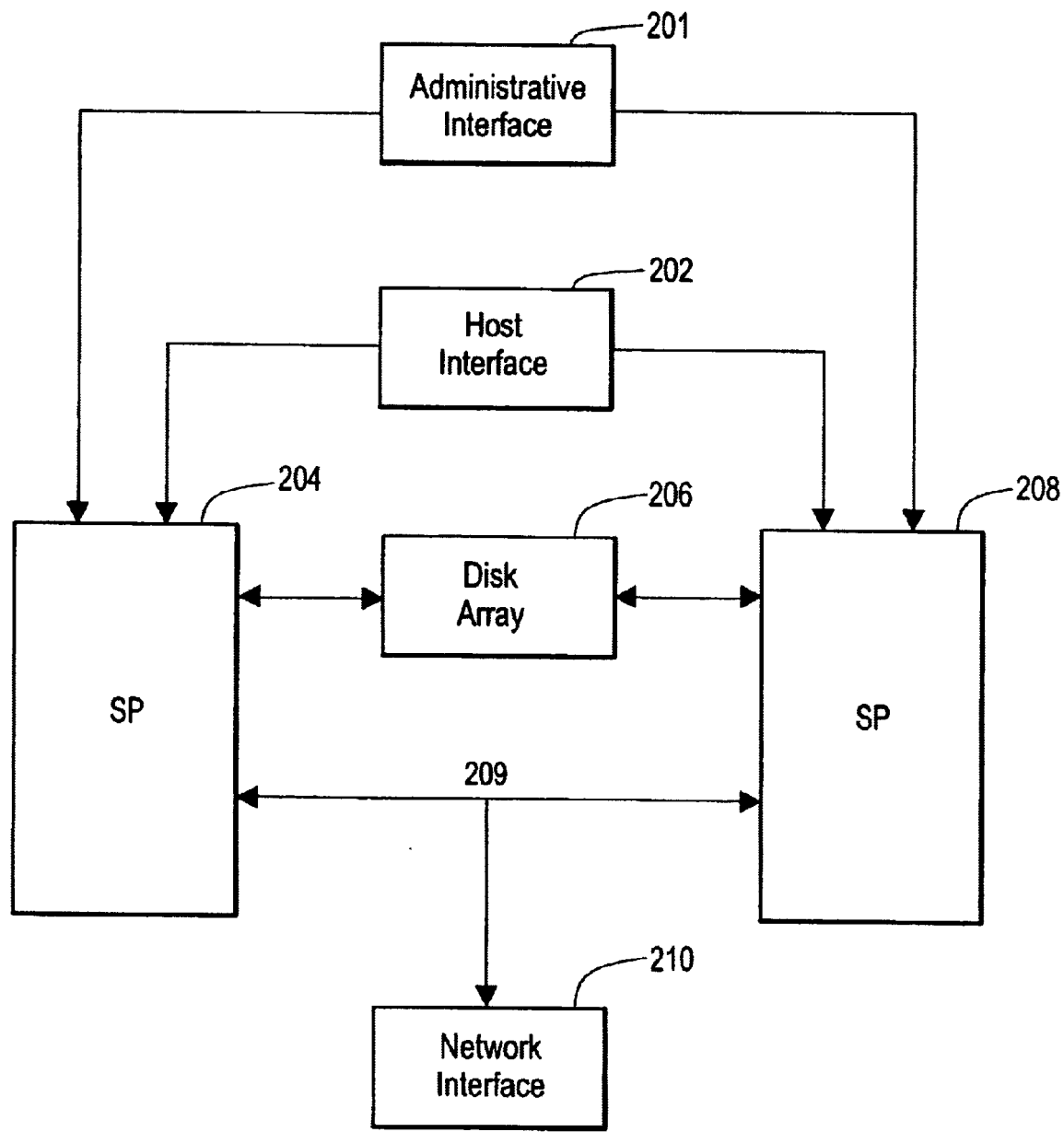
FIG. 2 is a block diagram showing an exemplary storage unit in accordance with an embodiment of the present invention.

As shown in FIG. 2, a preferred storage unit 200 includes an Administrative Interface 201, at least one Host Interface 202, at least a first Storage Processor (SP) 204 and an optional. second SP 208, a number of disks arranged as a Disk Array 206, and a Network Interface 210. The Administrative Interface 201 is preferably an Ethernet interface through which the storage unit 200 is managed and controlled. The Host 110 interfaces with the storage unit 200 through the Host Interface 202, which preferably emulates a SCSI interface. The Host Interface 202 is coupled to the SP 204 and to the optional SP 208, such that the Host 110 can communicate with both the SP 204 and the optional SP 208. The SP 204 and the optional SP 208 are interconnected through an interface 209, which is preferably a FibreChannel interface. The SP 204 and the optional SP 208 are also coupled to the Network Interface 210 via the interface 209, which enables each SP (204, 208) to communicate with SPs in other storage units within the computer storage system 120.

A preferred SP (204, 208) is based upon a multiple processor hardware platform that runs an operating system. Both SPs (204, 208) run essentially the same software, although the software can differ between the two SPs, for example, due to a software upgrade of one but not the other SP. Therefore, each SP (204, 208) is capable of providing full management functions for the storage unit.

The SP software requires each LU to be owned and accessed through one and only one SP at a time. This notion of LU ownership is referred to as "assignment." The SP software allows each LU in a LU Array Set to be "assigned" to a different SP. During normal operation of the storage unit, both SPs process requests and perform various management functions in order to provide redundancy for the storage unit. If one of the SPs fails, the other SP takes over management of the LUs for the failed SP.

Remote mirroring can be implemented with different SPs managing different LUs in a LU Array Set (or even with both SPs sharing access to each LU in the LU Array Set). However, such an implementation would require substantial inter-SP coordination for storing information in the LU Array Set. A preferred embodiment of the present invention therefore requires that all LUs in a LU Array Set be "assigned" to the same SP, thereby eliminating any inter-SP coordination for storing information in the LU Array Set. Thus, in a preferred embodiment of the invention, each mirror image is managed by one SP at a time. For convenience, the SP that is primarily responsible for managing a particular mirror image is referred to hereinafter as the "primary" SP, while other SP is referred to hereinafter as the "secondary" SP. For purposes of the following discussion, and with reference again to FIG. 2, the SP 204 will be referred to as the "primary" SP, and the SP 208 will be referred to as the "secondary" SP.

Figure 3:
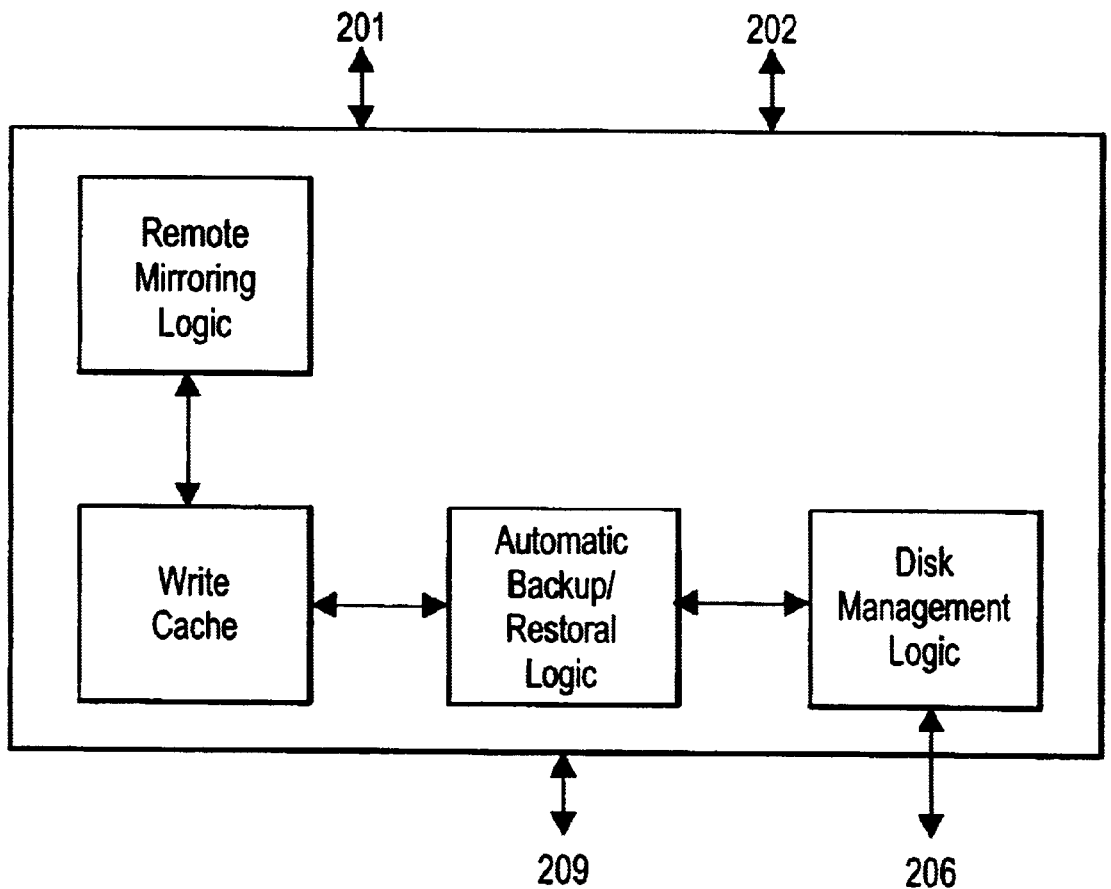
FIG. 3 is a block diagram showing a conceptual view of the relevant logic blocks of a storage processor in accordance with an embodiment of the present invention.

FIG. 3 shows a conceptual view of the relevant components of a SP, such as the primary SP 204 and the secondary SP 208, for operation in the master storage unit 130. As shown in FIG. 3, the SP includes, among other things, remote mirroring logic 302, write cache 304, automatic backup/restoral logic 306, and disk management logic 308.

The disk management logic 308 provides a range of services that permit the various components of the SP, including the remote mirroring logic 302 and the automatic backup/restoral logic 306, to access the Disk Array 206 and to communicate with other SPs, both within the same storage unit via the interface 209 and across storage units via the interface 209. The remote mirroring logic 302 utilizes services provided by the disk management logic 308 to maintain the master image in the Disk Array 206 and communicate with the slave storage units for coordinating updates of the slave images. The remote mirroring logic 302 is indirectly coupled to the Host Interface 202, through which the remote mirroring logic 302 interfaces with the Host 110. The remote mirroring logic 302 maintains the write intent log in the write cache 304, which is a local high-speed memory on the SP that is replicated on the peer SP (i.e., the write cache 304 on the SP 204 is replicated on the SP 208, and the write cache 304 on the SP 208 is replicated on the SP 204). The automatic backup/restoral logic 306 automatically stores the write cache 304, including the write intent log, in the Disk Array 206 upon detecting a failure of the master storage unit 130 and restores the write cache 304 from the Disk Array 206 when the SP recovers from the failure. In a preferred embodiment of the present invention, the remote mirroring logic 302 is implemented as a layered device driver that intercepts and processes information that is sent by the Host 10, as described in the related patent application entitled A COMPUTER ARCHITECTURE UTILIZING LAYERED DEVICE DRIVERS, which was incorporated by reference above.

In order to perform remote mirroring, the remote mirroring logic 302 requires a certain amount of persistent storage in the Disk Array 206. This persistent storage is used by the remote mirroring logic 302 to keep track of certain information (described in detail below), such as mirror state information, mirror membership information, mirror image configuration information, and other information needed to ensure proper operation of the mirror. Because this information is critical to the operation of the storage unit and to the computer storage system as a whole, the information must be highly available, and therefore redundant copies of the information are preferably maintained within the Disk Array 206 in case of a partial disk array failure.

As noted above, a LU Array Set is composed of one or more LUs. The ability to treat a group of LUs as a single entity simplifies the host administrator's task of managing a remote mirror for a host volume aggregated from one or more LUs. Remote mirroring uses this abstraction to preserve the ordering of all write requests between logically connected LUs when updating slave images. When using asynchronous mirroring, this ordering can be very important for database engines that spread tables and views across what it sees as multiple devices for performance and locality reasons.

Each LU Array Set within a mirror, whether it is composed of a single LU or multiple LUs, must be of the exact same physical size. This is because the master storage unit does a block-for-block forwarding of every write request it receives from the host system. If each image is constructed from a single LU, then each LU must be of the same physical size. If each image is constructed from multiple LUs, then the corresponding LUs between a master and its slaves must be the same physical size. For example, if the master image is composed of LUs A and B of sizes 8 Gb and 4 Gb, respectively, then each slave image must be composed of two LUs A' and B' of sizes 8 Gb and 4 Gb, respectively.

While the physical size of a LU Array Set must be consistent between images of the mirror, the RAID level of the LUs within each LU Array Set may be different. The RAID level of a LU determines a number of LU attributes, such as the manner in which information is stored in the LU, the amount of time it takes to store the information in the LU, and the amount of information that can be recovered from the LU in case of a LU failure. A preferred storage unit supports RAID levels 0, 1, 1/0, 3, and 5, which are well-known in the art. Among the various RAID levels, RAID level 5 provides the highest level of information recovery in case of a LU failure, but takes the most time to store the information in the LU. RAID level 0 provides the lowest level of information recovery in case of a LU failure, but takes the least amount of time to store the information in the LU. Each LU can be assigned a different RAID level.

In one embodiment of the present invention, the LUs associated with the master image are configured for RAID level 5, while the LUs associated with the slave image(s) are configured for RAID level 0. Using RAID level 5 for the master image makes the master image extremely robust. Using RAID level 0 for the slave image(s) allows each slave image to be written into its respective slave storage unit relatively quickly, which can reduce latency, particularly in synchronous remote mirroring.

The remote mirroring functionality can be described with reference to the operational states of a mirror in conjunction with the operational relationships between the master image and the slave image(s).

Figure 4:
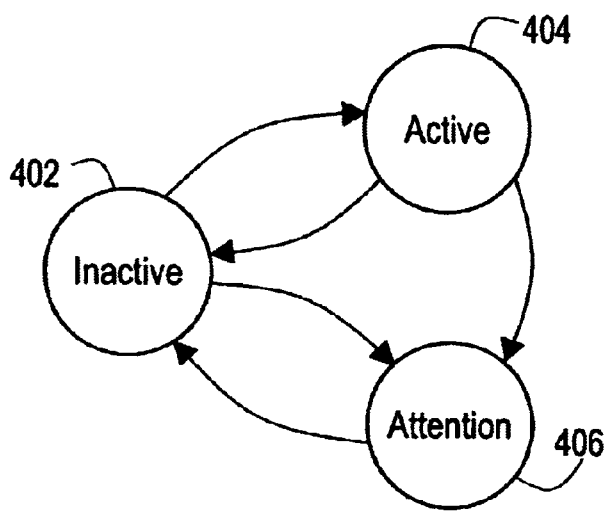
FIG. 4 is a state diagram showing the three primary states of a mirror in accordance with an embodiment of the present invention.

FIG. 4 is a state diagram showing the operational states of a mirror. For convenience, the state diagram shown in FIG. 4 does not show certain failure transitions and/or failure states. As shown in FIG. 4, there are three (3) primary states for a mirror, namely INACTIVE (402), ACTIVE (404), and ATTENTION (406). The primary distinction between the three (3) states is the way in which the mirror responds to read and write requests from the host.

The default mirror state is the INACTIVE state (402). In the INACTIVE state (402), the host is not permitted to access the master image. Thus, the host cannot read from the master image or write to the master image. The mirror defaults to the INACTIVE state (402) when the to mirror is created, and the mirror must be in the INACTIVE state (402) before the mirror can be deleted.

When the mirror is in the INACTIVE state (402), the administrator can attempt to activate the mirror. If the administrator attempts to activate the mirror and the mirror meets all minimum requirements for normal operation, then the mirror transitions into the ACTIVE state (404). However, if the administrator attempts to activate the mirror but the mirror fails to meet all minimum conditions for normal operation, the mirror transitions into the ATTENTION state (406).

The normal operating mirror state is the ACTIVE state (404). In the ACTIVE state (404), the host is permitted to access the master image. Thus, the host can read from the master image and write to the master image. If at any time the mirror fails to meet all minimum conditions for normal operation, the mirror automatically transitions into the ATTENTION state (406). The mirror transitions into the INACTIVE state (402) under direct administrative control.

The ATTENTION state (406) indicates that there is a problem somewhere within the mirror that is preventing the mirror from operating normally. In the ATTENTION state (406), the host is not permitted to access the master image. Thus, the host cannot read from the master image or write to the master image. If at any time the mirror meets all minimum conditions for normal operation, the mirror automatically transitions into the INACTIVE state (402).

Figure 5:
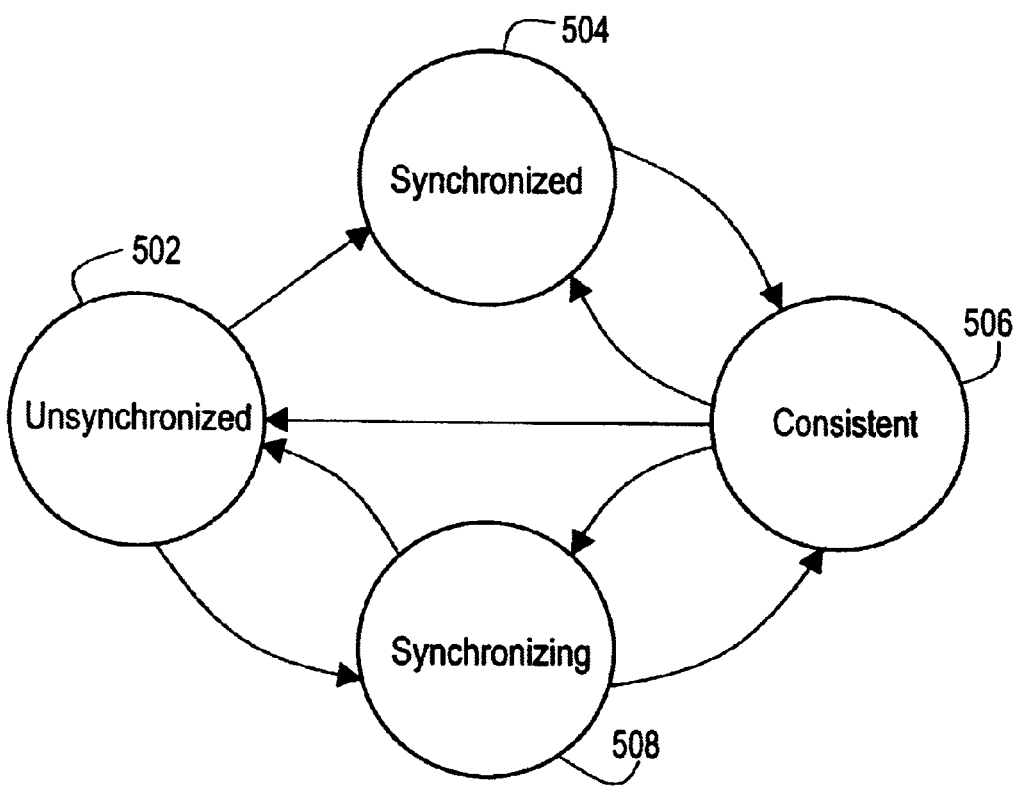
FIG. 5 is a state diagram showing the four primary states of a remote mirror image in accordance with an embodiment of the present invention.

FIG. 5 is a state diagram showing the operational relationships between the master image and a single slave image from the perspective of the slave image. It should be noted that different slave images may be in different states relative to the master image, and therefore the data contained in various slave images may differ. As shown in FIG. 5, there are four (4) primary states, namely UNSYNCHRONIZED (502), SYNCHRONIZED (504), CONSISTENT (506), and SYNCHRONIZING (508).

A slave image is considered to be in the UNSYCHRONIZED state (502) when no known relationship between the data in the slave image and the data in the master image can be readily determined. This is the case, for example, when the slave image is first added to the mirror.

From the UNSYNCHRONIZED state (502), the slave image transitions into the SYNCHRONIZING state (508) if and when the mirror is in the ACTIVE state (404). This is an implicit action taken by the remote mirroring software in the slave storage unit.

Also from the UNSYNCHRONIZED state (502), the slave image may be placed in the SYNCHRONIZED state (504) through administrative action. Specifically, the administrator can explicitly synchronize the slave image with the master image by placing the mirror in the INACTIVE state (402), copying the master image to the slave image or otherwise creating the slave image to be identical to the master image, and explicitly marking the slave image as being in the SYNCHRONIZED state (504).

A slave image is considered to be in the SYNCHRONIZED state (504) when the slave image is an exact byte-for-byte duplicate of the master image. This implies that there are no outstanding write requests from the host that have not been committed to stable storage on both the master image and the slave image.

From the SYNCHRONIZED state (504), the slave image transitions into the CONSISTENT state (506) when the mirror is in the ACTIVE state (404) and the master image commits a write request into its stable storage. At that point, the slave image is no longer an exact byte-for-byte duplicate of the master image, although the slave image is still consistent with the previous state of the master image.

A slave image is considered to be in the CONSISTENT state (506) if it is not currently an exact byte-for-byte duplicate of the master image but is a byte-for-byte duplicate of the master image at some determinable point in the past. In synchronous remote mirroring, the slave image can differ from the master image by at most one write request, since the master storage unit updates all slave storage units for each write request. However, in asynchronous remote mirroring, the slave image can differ from the master image by more than one write request, since the master storage unit updates the slave storage units asynchronously with respect to the write requests.

From the CONSISTENT state (506), the slave image transitions into the to SYNCHRONIZED state (504) if the mirror is in the ACTIVE state (404) and both the master image and the slave image have committed all write requests to stable storage (i.e., there are no outstanding write requests). This transition is made under the control of the master image. The slave image may also be placed in the SYNCHRONIZED state (504) by the administrator.

Also from the CONSISTENT state (506), the slave image transitions into the SYNCHRONIZING state (508) when either (1) the mirror is in the INACTIVE state (402) and the administrator explicitly forces the slave image into the SYNCHRONIZING state (508), or (2) the mirror is in the ACTIVE state (404) and the slave image determines that one or more write updates from the master image have been lost in transit.

Also from the CONSISTENT state (506), the slave image transitions into the UNSYNCHRONIZED state (502) if the mirror is in the ACTIVE state (404) and the write history maintained by the master storage unit is corrupted or lost.

A slave image is considered to be in the SYNCHRONIZING state (508) if it is being explicitly updated from the master image in a manner that is not the direct consequence of a host write to the master image. It should be noted that the actual synchronizing operation may require a full byte-for-byte copy of the master image or only the transmission (or retransmission) of a series of write requests.

From the SYNCHRONIZING state (508), the slave image transitions to the UNSYNCHRONIZED state (502) if, for any reason, the slave image fails to be synchronized with the master image. In this case, an attempt may be made to synchronize the slave image, although such synchronization may be impossible in certain situations, for example, due to lost communication to the slave image.

Also from the SYNCHRONIZING state (508), the slave image transitions to the CONSISTENT state (506) upon successful completion of the synchronization operation, regardless of the method used to synchronize the slave image.

It should be noted that the slave synchronization operations are completed transparently to the host. In order to prevent slave synchronization operations from affecting normal access to the mirror by the host, a throttling mechanism is used to limit the number of transactions between the master image and the slave image.

As described above, the host is only permitted to access the mirror through the master storage unit. Therefore, the remote mirroring driver prevents certain accesses to LUs associated with the mirror, specifically by intercepting certain requests that are received from higher level drivers. In order to intercept requests, each storage unit maintains a LU List identifying all of the storage unit LUs that are associated with the mirror. The remote mirroring driver in each slave storage unit intercepts any read or write request from a higher level driver that is targeted for a LU in the LU List and denies access to the LU, specifically by preventing the request from being processed by the lower level driver(s). Similarly, the remote mirroring driver in the master storage unit intercepts any write request from a higher level driver that is targeted for a LU in the LU List in order to perform the appropriate remote mirror functions. However, the remote mirroring driver in the master storage unit allows all read requests from higher level drivers to be processed by the lower level driver(s).

Each storage unit that participates in a mirror maintains a complete copy of a mirror database in its persistent storage. As mirror-related information changes, each storage unit updates its mirror database so that all participants have the same view of the mirror. This update across all mirror members is done in "atomic" fashion (i.e., the update across all mirror members is treated as a single operation that must be completed by all mirror members). By keeping this information local to each storage unit, the role of the master image can be assumed by any image in the mirror as directed by the administrator.

The information stored within the mirror database serves two purposes. The first is to provide persistent storage of each mirror's attributes. The second is to assist during failover conditions by maintaining the mirror's state information. The information in the mirror database is modified indirectly via administrator operations and/or directly via operational use of the mirror. The minimum amount of information required to meet the above purposes is maintained in the mirror database.

The information maintained for a particular mirror in the mirror database can be categorized as mirror-wide information and image-specific information.

In a preferred embodiment of the present invention, the mirror-wide information includes, among other things, a mirror name, a mirror state, a fracture log size parameter, a mirror extent size parameter, a maximum missing images parameter, a minimum images required parameter, a heartbeat parameter, a synchronization priority parameter, a write policy parameter, and a write backlog size parameter.

The mirror name is a symbolic name for the mirror. The mirror name is provided by the administrator when the mirror is created. The mirror name is maintained as a text string field within the mirror database.

The mirror state indicates whether the mirror is in the INACTIVE state (402), the ACTIVE state (404), or the ATTENTION state (406). The mirror state is updated dynamically by the remote mirroring software.

The fracture log size parameter specifies the size of each fracture log in units of mirror extent size (described below). The fracture log size parameter determines the number of missed updates that can be stored in the fracture log.

The mirror extent size parameter specifies the size, in blocks, to be used when a partial or full synchronization is necessary.

The maximum missing images parameter sets the maximum number of images that are allowed to be missing from the mirror while allowing the mirror to remain active. When this limit is reached, the mirror cannot be activated if it is in the INACTIVE state (402), or is placed in the ATTENTION state (406) if the mirror is in the ACTIVE state (404). A value of zero (0) requires that all slave images be present in order for the mirror to be active. A value of negative one (−1) is used to disable this feature.

The minimum images required parameter sets the minimum number of images that must be available before the mirror can be activated. Setting this value equal to the total number of images in the mirror requires that all images be present before the mirror can be activated. A value of negative one (−1) is used to disable this feature.

The heartbeat parameter sets the frequency of a heartbeat signal that is used by the master storage unit to determine "reachability" of each slave storage unit.

The synchronization priority parameter sets a priority for the mirror relative to any other mirrors maintained by the storage unit. When multiple mirrors must be synchronized, the synchronization priority parameter is used to schedule each mirror's synchronization in order to minimize the amount of mirror interconnect bandwidth devoted to synchronization.

The write policy parameter specifies whether the mirror is synchronous or asynchronous.

The write backlog size parameter sets the amount, in blocks, of host writes that can be queued on the master for subsequent delivery to the slave(s). The write backlog size parameter is only used for asynchronous remote mirroring.

In a preferred embodiment of the present invention, the image-specific information includes, among other things, an SP identifier, a LU Array Set identifier, an image designator, a mirror image state, a cookie, a timeout value parameter, a synchronization rate parameter, a synchronization progress indicator, and a recovery policy parameter.

The SP identifier uniquely identifies the primary SP and, if available, the secondary SP for the image.

The LU Array Set identifier identifies the one or more constituent LUs for the image.

The image designator specifies whether the image is a master image or a slave image.

The mirror image state indicates whether the image is in the UNSYNCHRONIZED state (502), the SYNCHRONIZED state (504), the CONSISTENT state (506), or the SYNCHRONIZING state (508).

The cookie is a dynamically updated value that contains consistency information that relates the state of the image to the state of the mirror.

The timeout value parameter indicates the amount of time that a slave storage unit is permitted to remain unreachable before the master storage unit considers it to be UNREACHABLE (described below)

The synchronization rate parameter indicates the rate at which image synchronizations are done, which is the mechanism by which synchronizations are throttled.

The synchronization progress indicator is used to maintain the status of a slave image synchronization. This value is consulted when an unreachable slave that had been undergoing synchronization becomes reachable.

The recovery policy parameter specifies whether or not the image should be automatically resynchronized when the image comes online.

In a preferred embodiment of the present invention, remote mirrors and their corresponding images are managed through a set of administrative operations. These administrative operations change certain characteristics or behavior of the entire mirror. Image operations are intended for a specific image of the mirror. In particular, some image operations are intended for the master image, while other operations are intended for a particular slave image.

Unless otherwise indicated, an administrative operation must be sent to the master storage unit, which in turn propagates the operation to the appropriate slave storage unit(s) as needed, specifically using a Message Passing Service (MPS) as described in the related application entitled SYSTEM, DEVICE, AND METHOD FOR INTERPROCESSOR COMMUNICATION IN A COMPUTER SYSTEM, which was incorporated by reference above. The master storage unit maintains status information for each slave storage unit in the mirror, specifically whether or not the slave storage unit is REACHABLE or UNREACHABLE (i.e., whether or not the master storage unit is able to communicate with the slave storage unit). If the master storage unit attempts to propagate mirror configuration information to a slave storage unit and the slave storage unit fails to acknowledge receipt of the mirror configuration information, then the master storage unit marks the slave storage unit as UNREACHABLE and propagates new mirror configuration information to the remaining slave storage units in the mirror.

The remote mirroring software must be notified of any configuration changes that affect the operation of mirrors. Such configuration changes are not mirror operations per se, but require notification to the mirroring software in order to ensure proper mirror behavior. For example, the remote mirroring software in each SP must be notified when an LU is reassigned from one SP to the other SP so that the SPs can coordinate any mirror-related recovery caused by the transition.

In order to create a mirror, the administrator first creates a LU Array Set on the master storage unit and configures the LU Array Set to operate as a master image. The administrator then invokes a CREATE MIRROR function in the master storage unit, specifying the LU Array Set and a mirror name. The CREATE MIRROR function initializes mirror configuration information and adds the LU Array Set to the LU List maintained by the master storage unit. If the LU Array Set does not exist or the LU Array Set is part of another mirror, then the CREATE MIRROR function fails to create the mirror. However, assuming that the CREATE MIRROR function completes successfully, then the mirror consists of a single (master) image, and is in the INACTIVE state (402).

Once a mirror is created, the administrator can add a slave image to the mirror, remove a slave image from the mirror, promote a slave image to operate as the master image, demote the master image to operate as a slave image, synchronize a slave image, fracture a slave image, restore a fractured slave image, activate the mirror, deactivate the mirror, or destroy the mirror. The administrator can also change mirror attributes or retrieve mirror attributes.

In order to add a slave image to the mirror, the administrator first creates a LU Array Set on the slave storage unit and configures the LU Array Set to operate as a slave image. The administrator then instructs the master storage unit to add the slave image to the mirror. The master storage unit in turn instructs the slave storage unit to add the slave image to the mirror. The slave storage unit may reject the request, for example, if the slave image is already in the mirror, the LU Array Set does not exist, or the LU Array Set is part of another mirror. However, assuming that the slave storage unit adds the slave image to the mirror, then the master storage unit updates its mirror configuration information to include the slave image, and the master storage unit distributes the new mirror configuration information to all slave storage units.

It should be noted that the slave image can be added to the mirror in either the SYNCHRONIZED state (504) or the UNSYNCHRONIZED state (502). Adding the slave image in the SYNCHRONIZED state (504) avoids any synchronization operations. Adding the slave image in the UNSYNCHRONIZED state (502) requires synchronization operations to synchronize the slave image to the master image. If the mirror is in the INACTIVE state (402) when the unsynchronized slave image is added to the mirror, then the slave image remains in the UNSYNCHRONIZED state (502). If the mirror is in the ACTIVE state (404) when the unsynchronized slave image is added to the mirror or the mirror is subsequently activated as described below, a synchronization operation is performed to synchronize the slave image to the master image.

In order to remove a slave image from the mirror, the administrator first deactivates the mirror as described below. The administrator then instructs the master storage unit to remove the slave image from the mirror. The administrator can request either a graceful removal of the slave image or a forced removal of the slave image. If the administrator requests a graceful removal of the slave image, then all outstanding requests to the slave image are completed before removing the slave image from the mirror. If the administrator requests a forced removal of the slave image, then the slave image is removed without completing any outstanding requests. In either case, the master storage instructs the slave storage unit to remote the slave image from the mirror. After verifying that the LU Array Set is part of the mirror, the slave storage unit removes the LU Array Set from the mirror, and removes the LU Array Set from the LU List. As a result, the remote mirroring driver in the slave storage unit stops intercepting requests that are targeted for the LUs in the LU Array Set. The master storage unit updates its mirror configuration information to exclude the slave image, and the master storage unit distributes the new mirror configuration information to all slave storage units. It should be noted that removing the slave image from the mirror does not delete the corresponding LUs or the data contained therein.

In order to promote a slave image to operate as the master image, the mirror cannot have a master image, and therefore the administrator must first demote an existing master image to operate as a slave image as described below. The administrator then instructs the slave storage unit to promote itself. Before promoting itself to master, the slave storage unit verifies that there is no existing master image in the mirror, that the slave image is in either the SYNCHRONIZED state (504) or CONSISTENT state (506), and that the slave image had not previously been removed from the mirror or marked UNREACHABLE. Assuming that there is nonexisting master image in the mirror, the slave image is in either the SYNCHRONIZED state (504) or CONSISTENT state (506), and the slave image had not previously been removed from the mirror or marked UNREACHABLE, then the slave storage unit promotes itself to operate as the master storage unit, in which case the new master storage unit updates its mirror configuration information and sends new mirror configuration information to the slave storage units in the mirror. It should be noted that the administrator can explicitly override the latter two promotion conditions, forcing the slave storage, unit to promote itself to master as long as there is no existing master image in the mirror.

In order to demote the master image to operate as a slave image, the administrator first deactivates the mirror as described below. The administrator then instructs the master storage unit to demote itself. Assuming the master storage unit is available, then the master storage unit updates its mirror configuration information and sends new mirror configuration information to the slave storage units in the mirror. However, if the master storage unit is unavailable, for example, due to failure, the administrator may instruct a slave storage unit to demote the master storage unit. Each slave storage unit updates its mirror configuration information to indicate that there is no master image in the mirror.

In order to synchronize a slave image, the administrator instructs the master storage unit to synchronize the slave image. The master storage unit performs a block-by-block copy of the master image to the slave image. This can be done while the mirror is in the ACTIVE state (404) or in the INACTIVE state (402). Any incoming write requests that are received by the master storage unit during resynchronization of the slave image are forwarded to the slave storage unit if and only if the write request is directed to a portion of the image that has already been written to the slave. A throttling mechanism is used to pace the synchronization operation in order to to prevent the synchronization operation from overloading the communication links between storage units.

In order to activate the mirror, the administrator instructs the master storage unit to activate the mirror. The master storage unit updates its mirror configuration information to put the mirror into the ACTIVE state (404), and informs all slave storage units that the mirror is active. Each slave storage unit in turn updates its mirror configuration information to put the mirror into the ACTIVE state (404).

In order to deactivate the mirror, the administrator instructs the master storage unit to deactivate the mirror. The administrator can request either a graceful deactivation of the mirror or a forced deactivation of the mirror. If the administrator requests a graceful deactivation of the mirror, then all outstanding requests to the slave images are completed before deactivating the mirror. If the administrator requests a forced removal of the slave image, then the mirror is deactivated without completing any outstanding requests. In either case, the master storage unit updates its mirror configuration information to put the mirror into the INACTIVE state (402), and removes all LUs associated with the mirror from the LU List. As a result, the remote mirroring driver in the master storage unit stops intercepting write requests that are targeted for the LUs in the LU Array Set. The master storage unit also informs all slave storage units that the mirror is inactive. Each slave storage unit in turn updates its mirror configuration information to put the mirror into the INACTIVE state (402).

In order to change mirror attributes, the administrator sends a request to the master storage unit. The master storage unit in turn updates its mirror configuration information and the mirror state (if necessary), and propagates the change request to the slave storage unit(s). Each slave storage unit updates its mirror configuration information and mirror state accordingly.

In order to retrieve mirror attributes (specifically, a copy of the mirror attributes for each image in the mirror), the administrator sends a request to any storage unit in the mirror. The receiving storage unit retrieves the mirror attributes for its own image, and also retrieves the mirror attributes for the other images in the mirror from the respective storage units. The receiving storage unit returns a copy of the mirror attributes for each image in the mirror (or a set of error codes for any unretrievable image) to the administrator.

In order to destroy the mirror, the mirror must consist of only the master image, and the mirror must be in the INACTIVE state (402). Thus, in order to destroy the mirror, the administrator first removes all slave images from the mirror and then deactivates the mirror, as described above. The administrator then instructs the master storage unit to destroy the mirror. The master storage unit removes all mirror configuration information associated with the mirror, and removes all LUs associated with the mirror from the LU List. As a result, the remote mirroring driver in the master storage unit stops intercepting write requests that are targeted for the LUs in the LU Array Set. It should be noted that destroying the mirror does not delete the corresponding LUs or the data contained therein.

During operation of the mirror, the primary SP in the master storage unit, and particularly the remote mirroring logic 302, maintains the write intent log in the write cache. Maintaining the write intent log involves storing write entries in the write intent log and removing unneeded write entries from the write intent log, and may also involve storing the write intent log in a nonvolatile storage (such as the Disk Array 206) upon detecting a failure and restoring the write intent log from the non-volatile storage upon recovery from the failure, particularly if the write intent log is kept in a volatile storage such as a Random Access Memory (RAM). Each write entry includes meta-data derived from a write request, and preferably identifies a particular image block that is being updated by the remote mirroring logic 302. So long as a particular write entry is in the write intent log, the remote mirroring logic 302 considers the corresponding image block to be potentially unsynchronized across all mirror images. Once all mirror images are updated based upon a particular write request, the remote mirroring logic 302 is free to remove the corresponding write entry from the write intent log.

Figure 6:
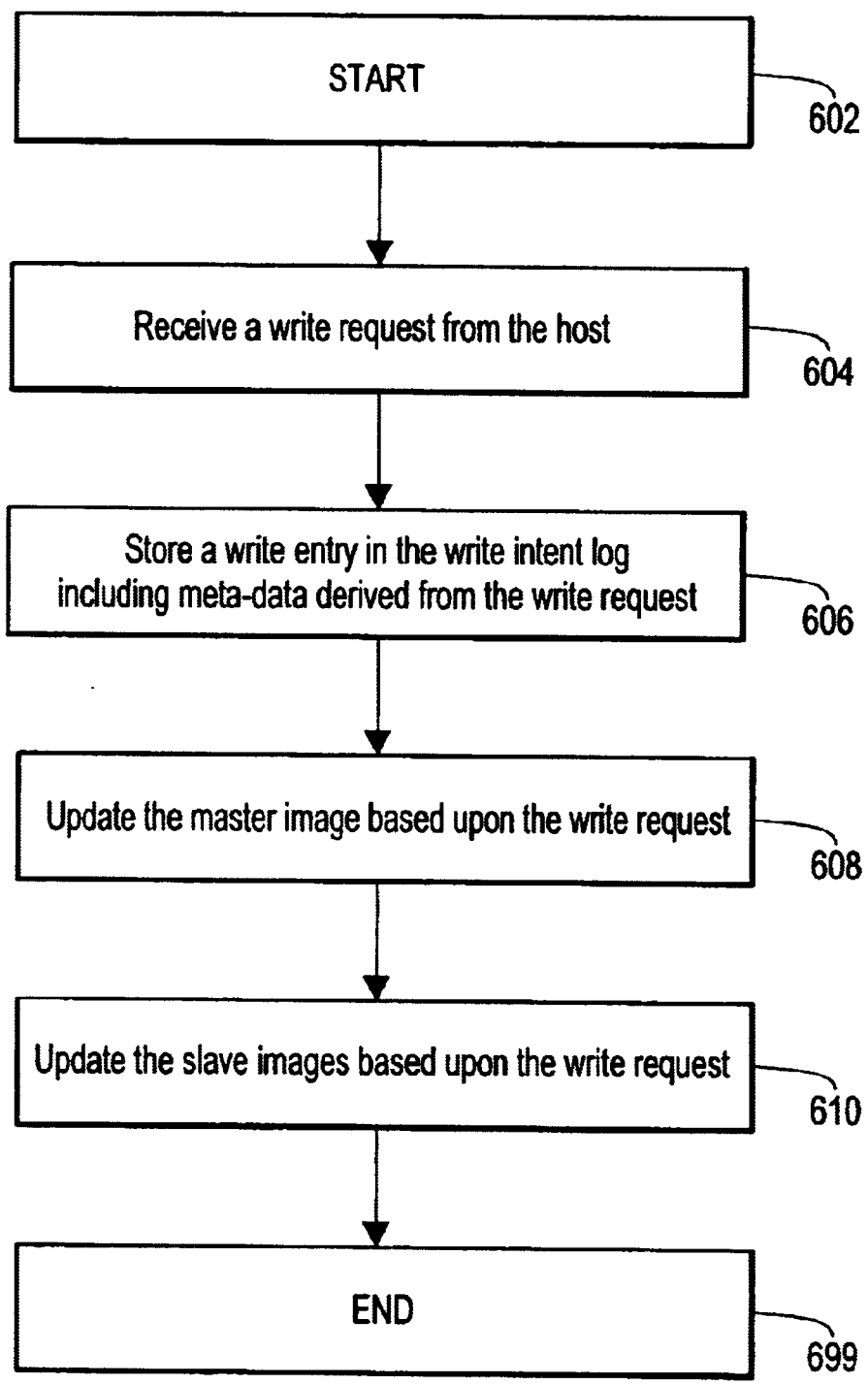
FIG. 6 is a logic flow diagram showing exemplary logic for processing a write request in accordance with an embodiment of the present invention.

FIG. 6 is a logic flow diagram showing exemplary remote mirroring logic for processing a write request. Beginning in step 602, and upon receiving the write request, in step 604, the remote mirroring logic stores a write entry in the write intent log including meta-data derived from the write request, in step 606. In a preferred embodiment of the present invention, the meta-data includes a block identifier identifying the image block being updated, although the meta-data may additionally or alternatively include write update information indicating one or more modifications to the image. After storing the write entry in the write intent log, in step 606, the remote mirroring logic proceeds to update the master image based upon the write request, in step 608, and then proceeds to update the slave images based upon the write request, in step 610. The remote mirroring logic for processing the write request terminates in step 699.

Figure 7:
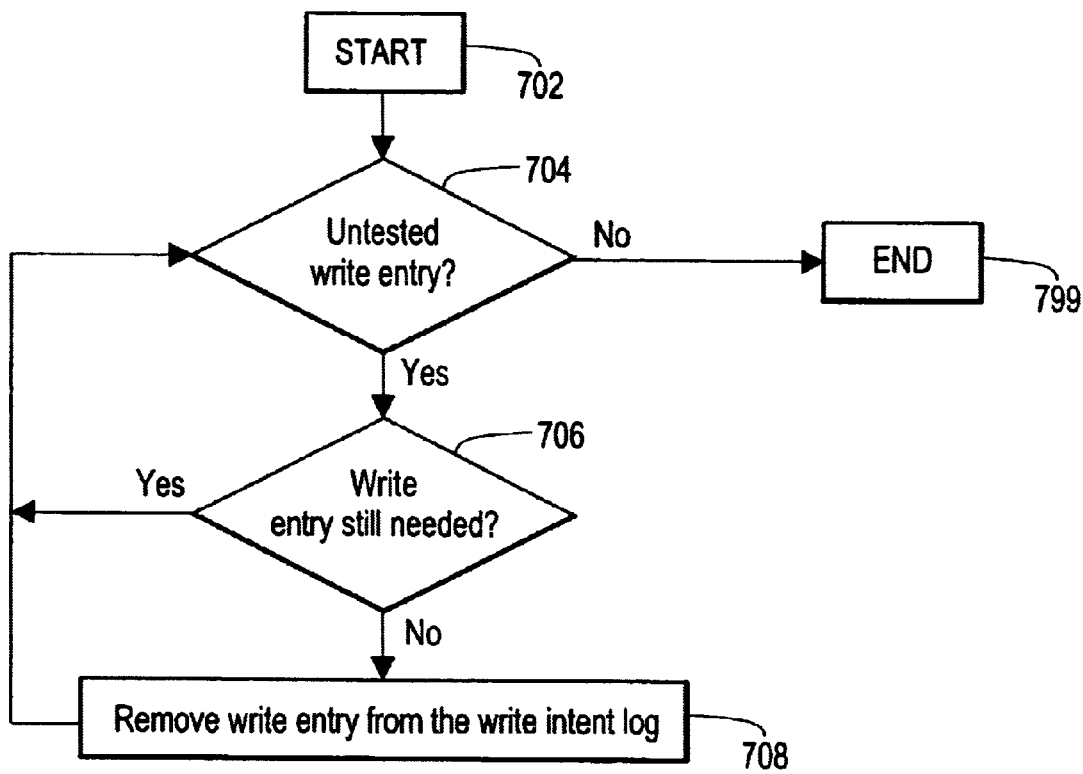
FIG. 7 is a logic flow diagram showing exemplary logic for removing unneeded write entries from a write intent log in accordance with an embodiment of the present invention.

FIG. 7 is a logic flow diagram showing exemplary remote mirroring logic for removing unneeded write entries from the write intent log, particularly using the "lazy" deletion technique. The remote mirroring logic periodically tests each write entry in the write intent log to determine whether the write entry is still needed, and removes the write entry from the write intent log if the write entry is determined to be unneeded. The write entry is considered to be needed if the remote mirroring logic is still in the process of updating one or more mirror images based upon the corresponding write request, and is considered to be unneeded if the remote mirroring logic has updated all mirror images based upon the corresponding write request.

Therefore, beginning in step 702, the remote mirroring logic determines whether there is an untested write entry in the write intent log, in step 704. If all write entries in the write intent log have been tested (NO in step 704), then the remote mirroring logic for removing unneeded write entries from the write intent log terminates in step 799. However, if there is an untested write entry in the write intent log (YES in step 704), then the remote mirroring logic proceeds to determine whether the write entry is still needed, in step 706. If the write entry is still needed (YES in step 706), then the remote mirroring logic recycles to step 704. However, if the write entry is unneeded (NO in step 706), then the remote mirroring logic removes the write entry from the write intent log, in step 708, and recycles to step 704.

During-operation of the mirror, it is possible for the master image to fail. The master image can fail due to a SP failure, a communication failure, or a media-failure. When the master image fails, the mirror cannot be accessed until either the master image is repaired or a slave image is promoted to operate as a master image as described above. Furthermore, failure of the master while a slave synchronization operation is taking place leaves the slave's state unchanged from what it was when the synchronization operation started. Once a master is established (either by repairing the current master or promoting a slave to operate as a master), the synchronization operation is restarted.

As mentioned above, an SP failure can cause a master image failure. An SP failure in a master storage unit that has a single SP results in an outright failure of the master image. However, failure of one SP in a master storage unit that has two SPs does not prevent the master storage unit from operating in the mirror, since the remaining SP is able to assume management and control of the master image so that the mirror can continue operating as usual (but without the security of a backup SP).

Therefore, when the primary SP in the master storage unit fails, the secondary SP assumes control of the master image. At the time of the failure, the write operations corresponding to any write entries in the write intent log may be at different points of completion. For example, the remote mirroring logic 302 may not have updated any image, may have updated the master image but no slave image, may have updated the master image and some of the slave images, or may have updated the master image and all of the slave images for any particular write operation. However, because the write intent log from the primary SP is replicated on the secondary SP, the secondary SP is able to resynchronize the slave images using the replicated write intent log. Specifically, rather than copying the entire master image to each of the slave storage units, the remote mirroring logic determines any portions of the slave images that may be unsynchronized based upon the write entries in the write intent log, and then resynchronizes only those portions of the slave images that may be unsynchronized, preferably by copying only those image blocks that may be unsynchronized.

Figure 8:
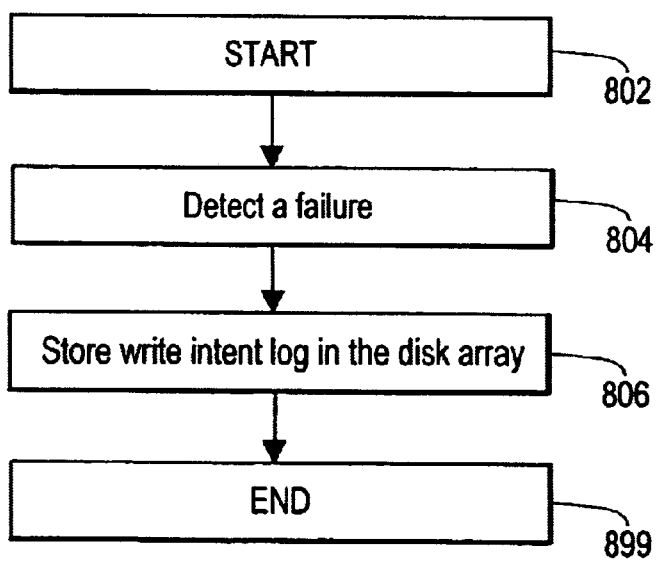
FIG. 8 is a logic flow diagram showing exemplary logic for automatically storing the write intent log in a nonvolatile storage upon detecting a failure in accordance with an embodiment of the present invention.

On the other hand, if the master storage unit fails, the automatic backup/restoral logic 306 automatically stores the write intent log in the Disk Array 206. FIG. 8 is a logic flow diagram showing exemplary automatic backup/restoral logic. Beginning in step 802, and upon detecting a SP failure, in step 804, the automatic backup/restoral logic 306 stores the write intent log in the Disk Array 206, in step 806, and terminates in step 899. In a preferred embodiment of the present invention, the master storage unit includes battery backup capabilities, allowing the automatic backup/restoral logic 306 to store the write intent log in the Disk Array 206 even in the case of a power failure. Furthermore, the automatic backup/restoral logic 306 actually stores multiple copies of the write intent log in the Disk Array 206 so that the write intent log can be recovered in case of a partial disk failure.

At the time of the failure, the write operations corresponding to any write entries in the write intent log may be at different points of completion. For example, the remote mirroring logic 302 may not have updated any image, may have updated the master image but no slave image, may have updated the master image and some of the slave images, or may have updated the master image and all of the slave images for any particular write operation.

Once the master storage unit is operation following the failure, the primary SP (which may be either the primary SP or the secondary SP from prior to the failure), and particularly the automatic backup/restoral logic 306, restores the write intent log from the Disk Array 206. The remote mirroring logic 302 may then be instructed to resynchronize the slave images. Rather than copying the entire master image to each of the slave storage units, the remote mirroring logic determines any portions of the slave images that may be unsynchronized based upon the write entries in the write intent log, and then resynchronizes only those portions of the slave images that may be unsynchronized, preferably by copying only those image blocks that may be unsynchronized.

Figure 9:
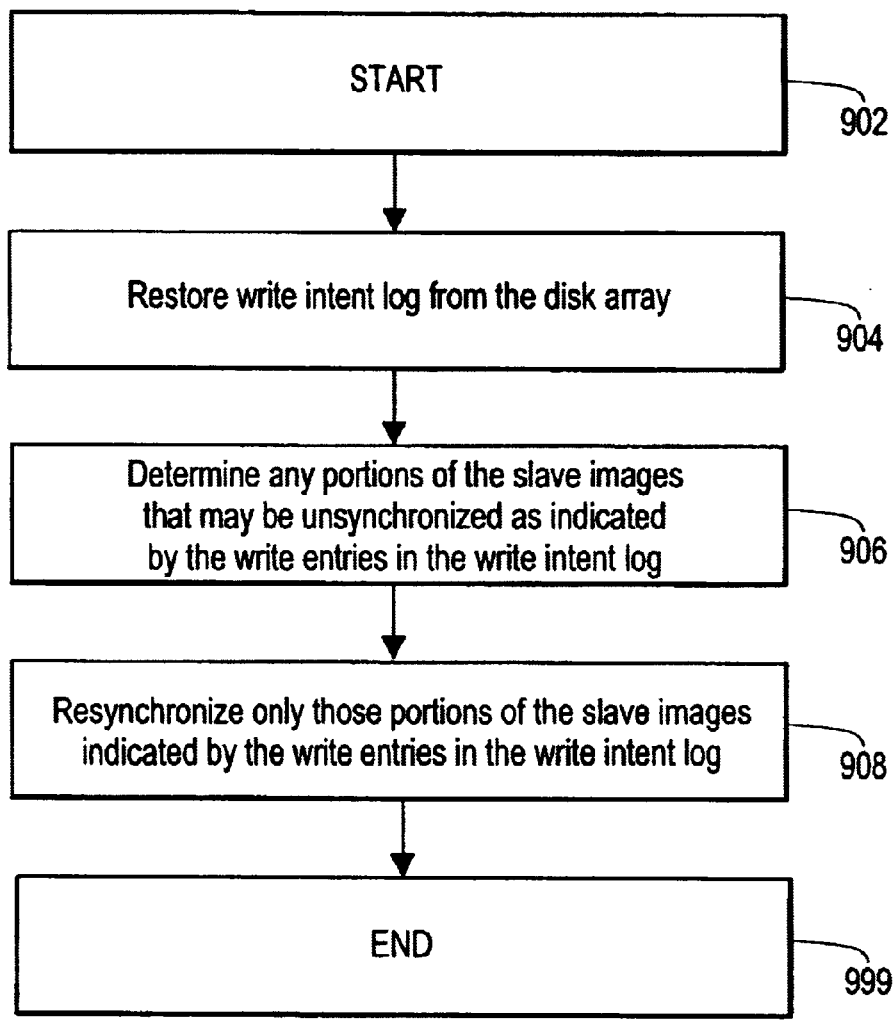
FIG. 9 is a logic flow diagram showing exemplary logic for resynchronizing the slave images following a failure in accordance with an embodiment of the present invention.
Figure 10A:
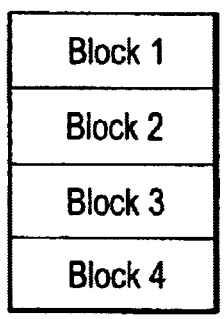
FIG. 10A is a block diagram showing the state of an exemplary write intent log after receiving a number of write requests in accordance with an embodiment of the present invention.
Figure 10B:
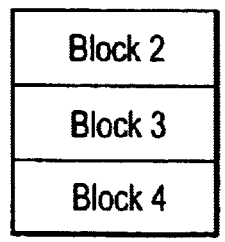
FIG. 10B is a block diagram showing the state of an exemplary write intent log at the time of a failure and after recovering from the failure in accordance with an embodiment of the present invention.

FIG. 9 is a logic flow diagram showing exemplary logic for resynchronizing the slave images following a failure in the master storage unit. Beginning in step 902, the logic first restores the write intent log from the Disk Array 206, in step 904. The logic then determines any portions of the slave images that may be unsynchronized as indicated by the write entries in the write intent log, in step 906, and resynchronizes only those portions of the slave images indicated by the write entries in the write intent log, in step 908. The logic terminates in step 999. to Certain aspects of the present invention can be demonstrated by example. In this example, the master storage unit receives a first write request to write to a first image block (Block 1), a second write request to write to a second image block (Block 2), a third write request to write to a third image block (Block 3), and a fourth write request to write to a fourth image block (Block 4). The master storage unit adds write entries into the write intent log indicating that Block 1, Block 2, Block 3, and Block 4 may be unsynchronized, as depicted in FIG. 10A, and then proceeds to update the mirror images based upon the write requests. Before a failure occurs, the master storage unit is able to update all of the mirror images based upon the first write request and delete the corresponding write entry (i.e., Block 1) from the write intent log, update all of the mirror images based upon the second write request but not delete the corresponding write entry from the write intent log, update some (but not all) of the mirror images based upon the third write request, and update none of the mirror images based upon the fourth write request. Thus, as shown in FIG. 10B, the write intent log includes write entries for Block 2, Block 3, and Block 4 at the time of the failure. It should be noted that, at the time of the failure, only Block 3 is actually unsynchronized, since the master storage unit has completed updating Block 2 for all mirror images and has not updated Block 4 in any of the mirror images. Upon recovery from the failure, the write intent log is as shown in-FIG. 10B, since the write intent log is preserved through the failure. Thus, the master storage unit copies Block 2, Block 3, and Block 4, as indicated in the write intent log, from the master image to all of the slave storage units for resynchronizing the slave images.

In a preferred embodiment of the present invention, predominantly all of the logic for maintaining the write intent log and utilizing the write intent log to resynchronize the slave images following a failure in the master storage unit is implemented as a set of computer program instructions that are stored in a computer readable medium and executed by an embedded microprocessor system within the master storage unit, and more particularly within a storage processor running in the master storage unit. Preferred embodiments of the invention may be implemented in any conventional computer programming language. For example, to preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for synchronizing a plurality of data images in a computer system. The plurality of data images include a master image and at least one slave image. The method involves maintaining a log identifying any portions of the plurality of data images that may be unsynchronized and resynchronizing only those portions of the plurality of data images that may be unsynchronized. Maintaining the log involves receiving a write request and storing in the log a write entry comprising information derived from the write request. The information derived from the write request may be a block identifier identifying an image block that may be unsynchronized or write update information indicating one or more modifications to the plurality of data images. Maintaining the log also involves updating the master image based upon the write request, updating the at least one slave image based upon the write request, and removing the write entry from the log after updating the master image and the at least one slave image based upon the write request. Maintaining the log may also involve writing the log to a non-volatile storage upon detecting a failure and restoring the log from the non-volatile storage upon recovery from the failure. Resynchronizing only those portions of the plurality of data images that may be unsynchronized involves copying only those portions of the master image to the at least one slave image. In a preferred embodiment of the present invention, the log identifies a number of image blocks that may be unsynchronized, in which case resynchronizing only those portions of the plurality of data images that may be unsynchronized involves copying only those image blocks that may be unsynchronized from the master image to the at least one slave image.

The present invention may also be embodied as an apparatus for maintaining a plurality of data images in a computer system. The plurality of data images include a master image and at least one slave image. The apparatus includes at least a non-volatile storage for storing at least the master image, a network interface for accessing the at least one slave image, a write intent log for indicating any portions of the at least one slave image that may be unsynchronized, and remote mirroring logic for maintaining the plurality of data images. The remote mirroring logic includes, among other things, resynchronization logic for resynchronizing the at least one slave image to the master image following a failure by resynchronizing only those portions of the at least one slave image that may be unsynchronized as indicated by the write intent log. The remote mirroring logic also includes receiving logic operably coupled to receive a write request from a host and log maintenance logic operably coupled to store in the write intent log a write entry including information derived from the write request. The information derived from the write request may be a block identifier identifying an image block that may be unsynchronized or write update information indicating one or more modifications to the plurality of data images. The remote mirroring logic also includes master image updating logic for updating the master image based upon the write request and slave image updating logic for updating the at least one slave image based upon the write request. The log maintenance logic removes the write entry from the write intent log after updating the master image and the at least one slave image based upon the write request, preferably using a "lazy" deletion technique. The apparatus may also include automatic backup/restoral logic for storing the write intent log in the non-volatile storage upon detecting a failure and restoring the write intent log from the non-volatile storage upon recovery from the failure. The resynchronization logic copies only those portions of the master image that may be unsynchronized to the at least one slave image. In a preferred embodiment of the present invention, the write intent log identifies a number of image blocks that may be unsynchronized, in which case the resynchronization logic copies only those image blocks that may be unsynchronized from the master image to the at least one slave image.

The present invention may also be embodied in computer program for maintaining a plurality of data images in a computer system. The plurality of data images include a master image and at least one slave image. The computer program includes disk management logic providing an interface to a non-volatile storage for storing at least the master image and to a network interface for accessing the at least one slave image and remote mirroring logic for maintaining the plurality of data images. The remote mirroring logic includes log maintenance logic programmed to maintain a write intent log indicating any portions of the at least one slave image that may be unsynchronized and resynchronization logic programmed to resynchronize the at least one slave image to the master image following a failure by resynchronizing only those portions of the at least one slave image that may be unsynchronized as indicated by the write intent log. The remote mirroring logic also includes receiving logic operably coupled to receive a write request from a host, in which case the log maintenance logic is programmed to store in the write intent log a write entry including information derived from the write request. The information derived from the write request may be a block identifier identifying an image block that may be unsynchronized or write update information indicating one or more modifications to the plurality of data images. The remote mirroring logic also includes master image updating logic for updating the master image based upon the write request and slave image updating logic for updating the at least one slave image based upon the write request. The log maintenance logic is programmed to remove the write entry from the write intent log after updating the master image and the at least one slave image based upon the write request, preferably using a "lazy" deletion technique. The computer program may also include automatic backup/restoral logic for storing the write intent log in the non-volatile storage via the disk management logic upon detecting a failure and restoring the write intent log from the non-volatile storage via the disk management logic upon recovery from the failure. The resynchronization logic copies only those portions of the master image that may be unsynchronized to the at least one slave image via the disk management logic. In a preferred embodiment of the present invention, the write intent log identifies a number of image blocks that may be unsynchronized, in which case the resynchronization logic copies only those image blocks that may be unsynchronized from the master image to the at least one slave image via the disk management logic.

The present invention may also be embodied as a computer system having a master storage unit for maintaining a master image and at least one slave storage unit for maintaining a slave image. The master storage unit maintains a log identifying any portions of the slave image that may be unsynchronized, and copies from the master image to the at least one slave storage unit only those portions of the master image identified in the log. The slave storage unit updates the slave image to include only those portions of the master image copied from the master image in order to synchronize the slave image to the master image.

The present invention may be embodied in other specific forms without departing from the essence or essential characteristics. The described embodiments are to be considered in all respects only as illustrative and not restrictive.

We claim:

1. A method for synchronizing a plurality of data images in a computer system, the computer system comprising a master storage unit for maintaining a master image and at least one slave storage unit for maintaining at least one slave image, the method comprising:

receiving a number of write requests identifying portions of the plurality of data images to be written to the master image and to the at least one slave image;

maintaining a log including a number of write entries identifying said portions of the plurality of data images;

subsequent to storing the write entries in the log, initiating write operations to the master image and to the at least one slave image for updating the identified portions of the plurality of data images such that the write operations can complete at different times and the write operation to the at least one slave image can complete prior to the write operation to the master image;

determining that there was a failure that may have caused said portions of the plurality of data images to become unsynchronized; and copying said portions of the plurality of data images identified in the log from the master image to the at least one slave image following recovery from said failure, wherein:

said copying overwrites a portion of the at least one slave image that had been updated with a portion of the master image that had not been updated, if a write operation had completed in the at least one slave image but not in the master image;

said copying overwrites a portion of the at least one slave image that had not been updated with a portion of the master image that had not been updated, if a write operation had completed in neither the at least one slave image nor the master image;

said copying overwrites a portion of the at least one slave image that had been updated with a portion of the master image that had been updated, if a write operation had completed in both the at least one slave image and the master image; and said copying overwrites a portion of the at least one slave image that had not been updated with a portion of the master image that had been updated, if a write operation had completed in the master image but not in the at least one slave image.

2. The method of claim 1, wherein maintaining the log further comprises removing unneeded write entries from the log.

3. The method of claim 2, wherein removing the unneeded write entries from the log following synchronization of the plurality of data images comprises:

determining a convenient time to delete the unneeded write entries; and deleting the unneeded write entries from the log at said convenient time.

4. An apparatus for synchronizing a plurality of data images in a computer system, the plurality of data images including a master image and at least one slave image, the apparatus comprising:

log maintenance logic operably coupled to receive a number of write requests identifying portions of the plurality of data images to be written to the master image and to the at least one slave image and to maintain a log including a number of write entries identifying said portions of the plurality of data images;

storage logic operably coupled to initiate write operations to the master image and to the at least one slave image for updating the identified portions of the plurality of data images such that the write operations can complete at different times and the write operation to the at least one slave image can complete prior to the write operation to the master image;

failure detection logic operably coupled to determine that there was a failure that may have caused said portions of the plurality of data images to become unsynchronized; and synchronization logic operably coupled to copy said portions of the plurality of data images identified in the log from the master image to the at least one slave image following recovery from said failure, wherein:

said copying overwrites apportion of the at least one slave image that had been updated with a portion of the master image that had not been updated, if a write operation had completed in the at least one slave image but not in the master image, said copying overwrites a portion of the at least one slave image that had not been updated with a portion of the master image that had not been updated, if a write operation had completed in neither the at least one slave image nor the master image;

said copying overwrites a portion of the at least one slave image that had been updated with a portion of the master image that had been updated if a write operation had completed in both the at least one slave image and the master image; and said copying overwrites a portion of the at least one slave image that had not been updated with a portion of the master image that had been updated, if a write operation had completed in the master image but not in the at least one slave image.

5. The apparatus of claim 4, wherein the log maintenance logic is operably coupled to remove unneeded write entries from the log.

6. The apparatus of claim 5, wherein the log maintenance logic is operably coupled to determine a convenient time to delete the unneeded write entries and delete the unneeded write entries from the log at said convenient time.

7. A program product comprising a computer readable medium having embodied therein a computer program for synchronizing a plurality of data images in a computer system, the plurality of data images including a master image and at least one slave image, the apparatus comprising:

log maintenance logic programmed to receive a number of write requests identifying portions of the plurality of data images to be written to the master image and to the at least one slave image and to maintain a log including a number of write entries identifying said portions of the plurality of data images;

storage logic programmed to initiate write operations to the master image and to the at least one slave image for updating the identified portions of the plurality of data images such that the write operations can complete at different times and the write operation to the at least one slave image can complete prior to the write operation to the master image;

failure detection logic programmed to determine that there was a failure that may have caused said portions of the plurality of data images to become unsynchronized; and synchronization logic programmed to copy said portions of the plurality of data images identified in the log from the master image to the at least one slave image following recovery from said failure, wherein:

said copying overwrites a portion of the at least one slave image that had been updated with a portion of the master image that had not been updated, if a write operation had completed in the at least one slave image but not in the master image;

said copying overwrites a portion of the at least one slave image that had not been updated with a portion of the master image that had not been updated, if a write operation had completed in neither the at least one slave image nor the master image;

said copying overwrites a portion of the at least one slave image that had been updated with a portion of the master image that had been updated, if a write operation had completed in both the at least one slave image and the master image; and said copying overwrites a portion of the at least one slave image that had not been updated with a portion of the master image that had been updated, if a write operation had completed in the master image but not in the at least one slave image.

8. The program product of claim 7, wherein the log maintenance logic is programmed to remove unneeded write entries from the log.

9. The program product of claim 8, wherein the log maintenance logic is programmed to determine a convenient time to delete the write entries and delete the write entries from the log at said convenient time.

10. A computer system comprising a master storage unit for maintaining a master image and at least one slave storage unit for maintaining at least one slave image, wherein:

the master storage unit is operably coupled to receive a number of write requests identifying portions of the plurality of data images to be written to the master image and to the at least one slave image; maintain a log including a number of write entries identifying said portions of the plurality of data images; initiate write operations to the master image and to the at least one slave image for updating the identified portions of the plurality of data images such that the write operations can complete at different times and the write operation to the at least one slave image can complete prior to the write operation to the master image; determine that there was a failure that may have caused said portions of the plurality of data images to become unsynchronized; and copy those portions of the master image identified in the log to the at least one slave storage unit following recovery from said failure, wherein:

said copying overwrites a portion of the at least one slave image that had been updated with a portion of the master image that had not been updated, if a write operation had completed in the at least one slave image but not in the master image;

said copying overwrites a portion of the at least one slave image that had not been updated with a portion of the master image that had not been updated, if a write operation had completed in neither the at least one slave image nor the master image;

said copying overwrites a portion of the at least one slave image that had been updated with a portion of the master image that had been updated, if a write operation had completed in both the at least one slave image and the master image; and said copying overwrites a portion of the at least one slave image that had not been updated with a portion of the master image that had been updated, if a write operation had completed in the master image but not in the at least one slave image; and the at least one slave storage unit is operably coupled to update those portions of the at least one slave image copied from the master image in order to synchronize the at least one slave image with the master image.

11. A method for synchronizing a plurality of data images in a computer system, the computer system comprising a master storage unit for maintaining a master image and at least one slave storage unit for maintaining at least one slave image, the method comprising:

receiving a number of write requests identifying portions of the plurality of data images to be written to the master image and to the at least one slave image;

maintaining a log including a number of write entries identifying said portions of the plurality of data images;

subsequent to storing the write entries in the log, initiating write operations to the master image and to the at least one slave image for updating the identified portions of the plurality of data images such that the write operations can complete at different times and the write operation to the at least one slave image can complete prior to the write operation to the master image;

determining that there was a failure that may have caused said portions of the plurality of data images to become unsynchronized; and copying said portions of the plurality of data images identified in the log from the master image to the at least one slave image following recovery from said failure without first checking if a portion of the slave image is different than a corresponding portion of the master image, wherein said copying overwrites a portion of the at least one slave image that had been updated with a portion of the master image that had not been updated, if a write operation had completed in the at least one slave image but not in the master image.

* * * * *